US008650233B2

(12) United States Patent
Ikegami et al.

(10) Patent No.: US 8,650,233 B2
(45) Date of Patent: Feb. 11, 2014

(54) RANDOM NUMBER GENERATOR INCLUDING A VARIABLE FREQUENCY OSCILLATOR

(75) Inventors: Kazutaka Ikegami, Fuchu (JP); Shinichi Yasuda, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1227 days.

(21) Appl. No.: 12/235,995

(22) Filed: Sep. 23, 2008

(65) Prior Publication Data
US 2009/0222502 A1  Sep. 3, 2009

(30) Foreign Application Priority Data

Feb. 28, 2008  (JP) ................. P2008-048643

(51) Int. Cl.
*G06F 1/02*  (2006.01)
*G06F 7/58*  (2006.01)
(52) U.S. Cl.
USPC ..................... 708/251; 708/250; 708/252
(58) Field of Classification Search
None
See application file for complete search history.

(56) References Cited

U.S. PATENT DOCUMENTS

| | | | | |
|---|---|---|---|---|
| 5,689,213 A * | 11/1997 | Sher | ................ | 331/57 |
| 5,815,043 A * | 9/1998 | Chow et al. | ................ | 331/57 |
| 6,650,190 B2 * | 11/2003 | Jordan et al. | ................ | 331/57 |
| 7,702,705 B2 * | 4/2010 | Suzuki | ................ | 708/250 |
| 2006/0284693 A1 * | 12/2006 | Nelson | ................ | 331/57 |
| 2007/0200635 A1 * | 8/2007 | Meltzer | ................ | 331/16 |
| 2008/0278223 A1 * | 11/2008 | Kernahan et al. | ................ | 327/538 |

FOREIGN PATENT DOCUMENTS

JP  2001-166920  6/2001

OTHER PUBLICATIONS

J.Wawrzynek, "Lab 6 Nasty Realities", Spring 1998, University of California at Berkeley.*

* cited by examiner

*Primary Examiner* — Lewis A Bullock, Jr.
*Assistant Examiner* — Mark Gooray
(74) *Attorney, Agent, or Firm* — Oblon, Spivak, McClelland, Maier & Neustadt, L.L.P.

(57) ABSTRACT

A random number generator includes: a variable frequency oscillator that includes: a selection circuit having multiple input terminals and an output terminal; a parallel circuit having an input terminal and multiple output terminals that are respectively connected to the input terminals of the selection circuit, the parallel circuit including one or more buffer circuits to be selected by the selection circuit; and an inverter circuit having a control terminal, the inverter circuit being connected to the input terminal of the parallel circuit and to the output terminal of the selection circuit; and a latch circuit connected to the variable frequency oscillator.

20 Claims, 19 Drawing Sheets

RANDOM NUMBER GENERATOR INCLUDING A VARIABLE FREQUENCY OSCILLATOR

RELATED APPLICATION(S)

The present disclosure relates to the subject matters contained in Japanese Patent Application No. 2008-048643 filed on Feb. 28, 2008, which are incorporated herein by reference in its entirety.

FIELD

The present invention relates to a random number generator configured by a digital logic circuit.

BACKGROUND

With advancement and popularization of information communication technology, demands for random numbers having high-quality randomness have increased. This is because an information security level depends on difficulty in predicting a random number. Further, in the field of scientific and engineering calculations, random numbers having high-quality randomness are required for more accurate calculations. For the aforementioned reasons, there is a growing demand for a random number generator for generating random numbers having high-quality randomness at high speed.

Among electronic circuits that generate random numbers, there is a random number generator configured by a digital circuit with an oscillator. This type of random number generator generates random numbers from an oscillation signal being affected by an ambient thermal noise. One type of the random generating circuit, which is configured by combining a digital circuit and an oscillator, includes a latch circuit and a circuit having a ring oscillator and an additional circuit serving as a thermal noise source.

An example of such random generating circuit is disclosed in JP-A-2001-166920. The random number generator disclosed in the publication is configured to add a thermal noise to an oscillation signal of the ring oscillator, to thereby add a fluctuation to the oscillation frequency of the ring oscillator. Thus, a phase of the oscillation at latch timing of the latch circuit is changed to generate a random number.

However, the circuit configured by combining a digital circuit with an oscillator as described in the publication needs consideration of two factors for oscillation frequency, i.e., easiness of latching at the oscillation frequency of the oscillator and easiness of changing the phase of an oscillation.

More particularly, in order to latch a numerical value input to a flip-flop, the numerical value should be determined before a setup time of a clock of the flip-flop and be held until a hold time lapses. Accordingly, an output signal that is output from the ring oscillator, which is utilized for a data input and a clock input in the flip-flop, needs to have a low frequency that is sufficient enough to assure the setup time and the hold time. However, a change in the phase of the output signal of the ring oscillator due to the noise is more easily caused when the output signal has a higher frequency.

As described above, the oscillation frequency of the oscillator is preferable to have a lower frequency in consideration of the easiness of the latch by the flip-flop whereas the oscillation frequency is preferable to have a higher frequency in consideration of the easiness of the change of the phase due to the noise. The oscillator is required to be designed while balancing the antinomic requirements described above.

SUMMARY

According to an aspect of the present invention, there is provided a random number generator including: a variable frequency oscillator that includes: a selection circuit having multiple input terminals and an output terminal; a parallel circuit having an input terminal and multiple output terminals that are respectively connected to the input terminals of the selection circuit, the parallel circuit including one or more buffer circuits to be selected by the selection circuit; and an inverter circuit having a control terminal, the inverter circuit being connected to the input terminal of the parallel circuit and to the output terminal of the selection circuit; and a latch circuit connected to the variable frequency oscillator.

DETAILED DESCRIPTION OF THE EMBODIMENTS

Embodiments of the present invention will be described below with reference to the accompanying drawings.

Figure 1:
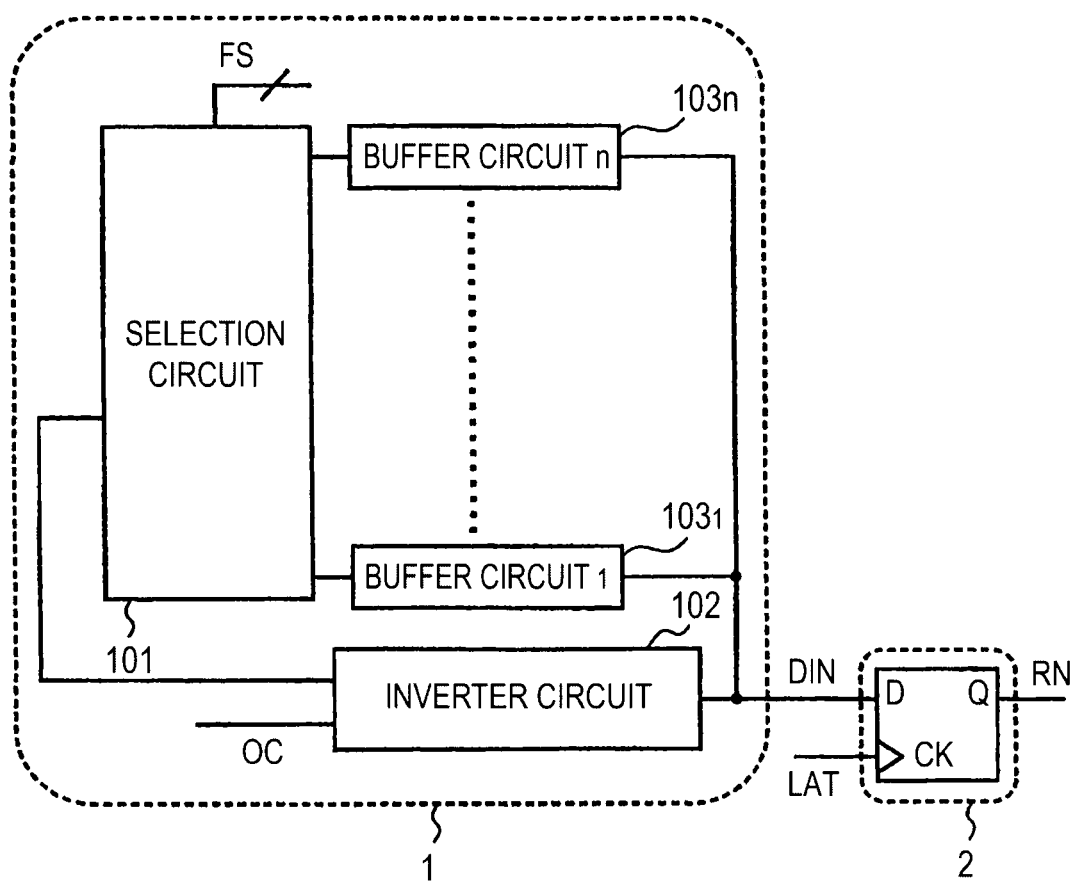
FIG. 1 is a block diagram illustrating a random number generator according to the present invention.

FIG. 1 is a block diagram illustrating a random number generator according to the present invention. The random number generator according to the present invention includes a variable frequency oscillator 1 and a latch circuit 2.

As illustrated in FIG. 1, the variable frequency oscillator 1 includes a selection circuit 101, an inverter circuit 102 having a control terminal, to which an output of the selection circuit 101 is input, and one or more buffer circuits $103_1$ to $103_n$ to be selected by the selection circuit 101. The selection circuit 101 outputs one of inputs from the buffer circuits $103_1$ to $103_n$ in accordance with a value of a signal input to an oscillating frequency selection terminal FS of the selection circuit 101. The selection circuit 101 may be configured by a multiplexer.

The inverter circuit 102 inverts, only when a specific value is given to the control terminal OC, a signal given to the input terminal thereof and outputs the inverted signal. Practical examples of the inverter circuit 102 are an XOR gate, a NOR gate, and a NAND gate.

The buffer circuits $103_1$ to $103_n$ output signals input thereto without change. Each of the buffer circuits $103_1$ to $103_n$ may be configured by an even number of series-connected inverters or by a short circuit. The circuit configured by series-connecting inverters is referred to as an inverter chain. A part of the buffer circuits $103_1$ to $103_n$ may be replaced by an inverter circuit that inverts an input signal and outputs the inverted signal. The inverter circuit may be configured by an odd number of series-connected inverters (inverter chain). Each of the selection circuit 101, the inverter circuit 102, the buffer circuit, and the inverter circuit may be configured by a combination of a plurality of logic gates, as long as the combination of the logic gates operates to serve as the respective circuits.

The latch circuit 2 outputs a value given to an input terminal D from a terminal Q at the timing of a rise or fall of a signal LAT input to a clock terminal CLK thereof. The latch circuit 2 holds (latches) the value output from the terminal Q until the signal LAT performs a specific change. The latch circuit 2 may be configured by a delay-type flip-flop (D flip-flop) or a delay-type latch (D latch).

Figure 4:
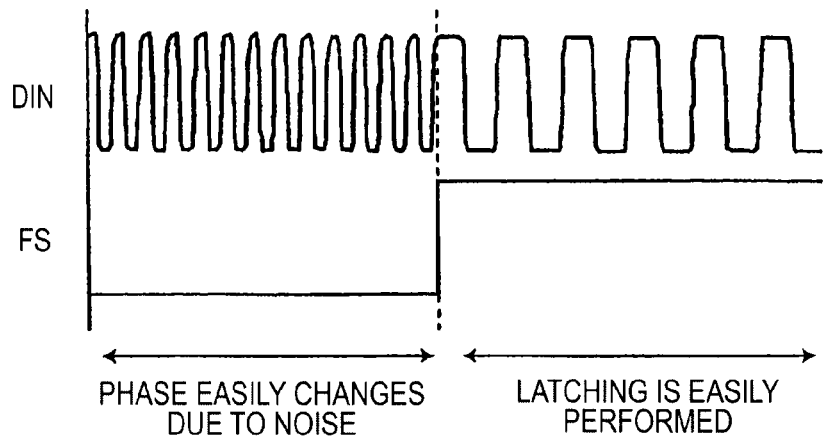
FIG. 4 is a wave pattern chart illustrating the relationship between wave patterns FS and DIN of a ring oscillator according to the first embodiment including an XOR, a buffer circuit, and a multiplexer.

A mechanism for changing a frequency of the variable frequency oscillator 1 is described hereinbelow. According to a value given to the terminal FS of the selection circuit 101, one of the buffer circuits $103_1$ to $103_n$ connected to an input terminal of the selection circuit 101 or the inverter circuit configures a loop together with the selection circuit 101 and the inverter circuit 102. In a case where a circuit configuring the loop is configured to be a buffer circuit, the loop operates to serve as a ring oscillator, and an oscillating wave pattern is output from an output terminal DIN of the variable frequency oscillator 1. An example of the oscillating wave pattern is illustrated in FIG. 4. Each of the buffer circuits $103_1$ to $103_n$ is configured to have a circuit configuration that is different from one another, e.g., by having different number of stages (i.e., the number of series-connected inverters) of the inverter chain, to thereby have a delay time (delay of a signal input to an input terminal of the respective buffer circuits $103_1$ to $103_n$ at an output terminal thereof) different from one another. Therefore, the oscillating frequency can be changed by selectively changing the buffer circuits $103_1$ to $103_n$ to be used to configure the loop.

In a case where the circuit configuring the loop is configured as an inverter circuit, the loop operates to serve as a bistable circuit, and the wave pattern at the output terminal DIN becomes leveled. The circuit configuration of the circuit, i.e., the buffer circuit or the inverter circuit configuring the loop, can be changed by selecting one of the buffer circuits $103_1$ to $103_n$ in accordance with a value given to the terminal FS of the selection circuit 101. According to the control operation thus described, the oscillating frequency of the variable frequency oscillator 1 and ON/OFF of the oscillation can be controlled.

By controlling the oscillating frequency of the variable frequency oscillator 1, the random number generator is configured to have both of the advantage of high-frequency oscillations, which resides in that the phase of the oscillation can easily be changed by the ambient noises, and the advantage of low-frequency oscillations, which resides in that latching can easily be achieved. The ambient noises may be ordinary thermal noises being emitted by transistors and resistors, or may be noises being emitted when a surrounding circuit operates.

Figure 2:
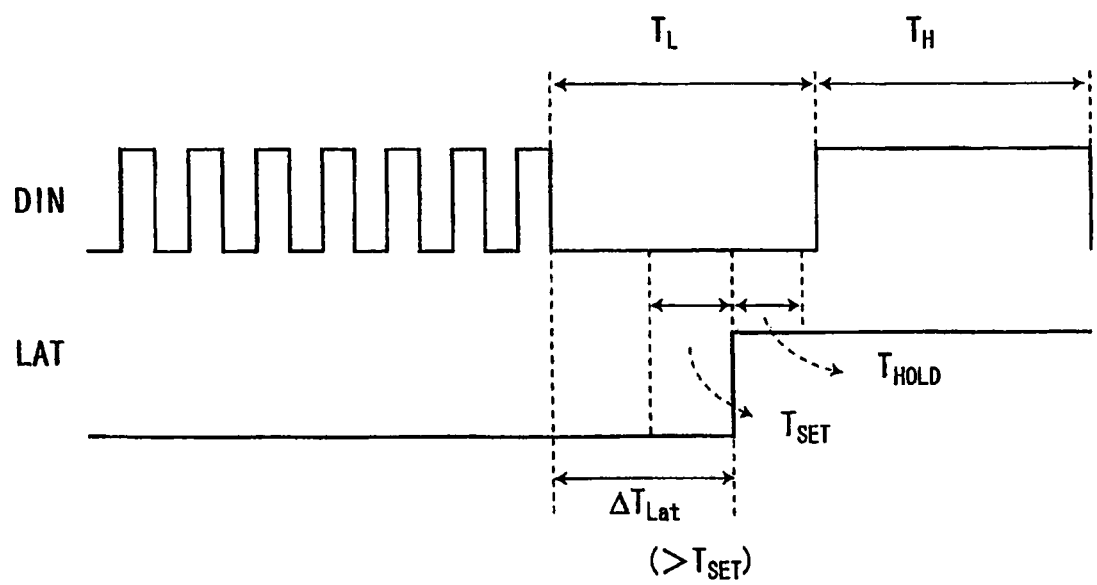
FIG. 2 is a timing chart illustrating an oscillating frequency of the random number generator according to the present invention.

The preferable oscillating frequency of the random number generator according to the present invention is described in more detail with reference to FIG. 2. The oscillating frequency is preferable to have higher frequency for the purpose of changing its phase by being affected by the ambient noises, however, in order to prevent the oscillating frequency to become a noise source and adversely affecting other surrounding circuits, the oscillating frequency may be appropriately set to a lower frequency.

The random number generator according to the present invention needs to lower the oscillating frequency at the time of latching by the latch circuit 2 by an amount sufficient to the extent that a setup time $T_{SET}$ and a hold time $T_{HOLD}$ can be assured. More particularly, the setup time $T_{SET}$ and the hold time $T_{HOLD}$ should satisfy a relationship shown by the following Expression (1), where $T_H$ is a time in which the level of a signal is high, and $T_L$ is a time in which the level of the signal is low in the oscillation at the time of latching.

$$\min(T_H, T_L) > (T_{SET} + T_{HOLD}) \qquad (1)$$

Also, a time $\Delta T_{Lat}$ from a timing, at which the oscillating frequency just prior to latching is changed, to a latch timing should satisfy a relationship shown by the following Expression (2)

$$\Delta T_{Lat} > T_{SET} \qquad (2)$$

In the random number generator according to the present invention, it is most preferable that the oscillation frequency of the variable frequency oscillator 1 is gradually reduced. This is because that the phase of the oscillation is more likely to be changed by the noises in a chase where the oscillation frequency is higher. The oscillation may be performed by being controlled to increase the oscillation frequency during the oscillation. For example, the control may be performed to temporary stop the oscillation in a case where the oscillation might serve as a noise source to other surrounding circuits.

It is preferable to design the configuration of the buffer circuit and the inverter circuit that configures the loop and design the control of a signal given to the terminal FS of the selection circuit 101 to cause a gate delay of a logic gate that configures the buffer circuit and the inverter circuit, such that the logic gate can follow the oscillation immediately before the change to the respective one of the buffer circuit and the inverter circuit. When a fast changing signal that the logic gate cannot follow is input to an input terminal of the logic gate, the logic gate outputs a constant value. That is, in a case where the buffer circuit or the inverter circuit includes a logic gate which cannot follow the oscillation, the circuit including such logic gate outputs a constant value. In a case where the circuit configuring the loop is changed to the buffer circuit or the inverter circuit that cannot follow the oscillation during the oscillation, the circuit having large delay starts to oscillate independently of the oscillation immediately before the change to the buffer or inverter circuit. Thus, there is a possibility that the circuit having large delay may dominate over the oscillation of the entire oscillator. When the variable frequency oscillator 1 operates as described above, even in a case where the phase is changed due to the influence of noises during high-frequency oscillation, information on the phase is not transmitted to the oscillation posterior to the change of the circuit and the change of the phase would be lost.

First Embodiment

A random number generator according to a first embodiment of the present invention will be described with reference to FIG. 3. A dual-input multiplexer 201 is used as the selection circuit. An XOR gate 202 is used as the inverter having the control terminal. A parallel circuit 203, which includes a short circuit and twelve inverter chains, is used as the buffer circuits. Although the number of inverter chains is twelve in the present embodiment, the number of inverter chains is optional as long as each of the inverter chains includes a plurality of inverters and satisfies the Expression (1).

In this circuit, when the level of a signal input to the terminal OC is set to be a high level "H", a ring oscillator including the XOR gate 202, the parallel circuit 203, and the multiplexer 201 oscillates. In a case where the buffer circuit configuring the loop is a short circuit, the oscillator performs a high-frequency oscillation. In a case where the buffer circuit configuring the loop is twelve inverter chains, the oscillator performs a low-frequency oscillation. FIG. 4 illustrates an example of a simulated wave pattern representing the relationship between signals at the terminals FS and DIN. When the level of the signal input to the terminal FS is a low level "L", the signal output from the terminal DIN exhibits a wave pattern of a high-frequency oscillation. When the level of the signal input to the terminal FS is a high level "H", the signal output from the terminal DIN exhibits a wave pattern of a low-frequency oscillation. The random number generator according to the first embodiment is implemented to perform such a control operation so as to have both of the advantage of high-frequency oscillations, which resides in that the phase of an oscillation can easily be changed, and that of low-frequency oscillations, which resides in that latching can easily be achieved.

Figure 3:
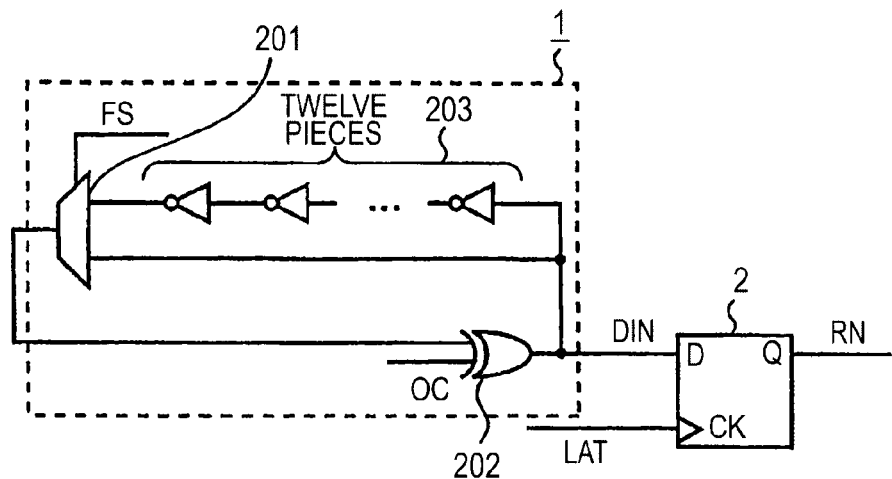
FIG. 3 is a block diagram illustrating a random number generator according to a first embodiment.
Figure 5:
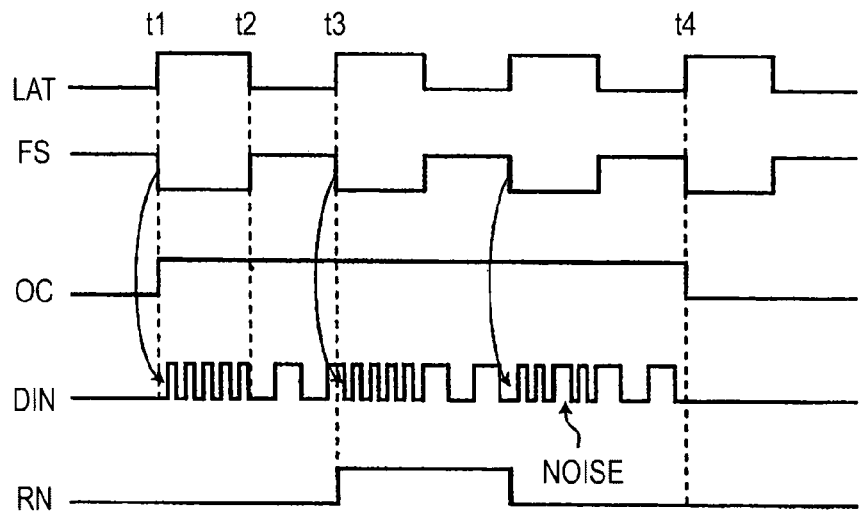
FIG. 5 is a timing chart illustrating an example of an operation when the circuit shown in FIG. 3 is employed.

FIG. 5 is an example of a timing chart illustrating an operation in the case of using the circuit illustrated in FIG. 3. In FIG. 5, reference characters LAT, FS, and OC represent control signals which are externally provided and which are used to control the latch circuit 2, the multiplexer 201 and the XOR gate 202, respectively. Reference characters DIN and RN represent an input signal to and an output signal from the latch circuit 2, respectively. When the level of the control signal OC rises at time t1, the circuit starts oscillating. When the level of the control signal FS changes from a low level "L" to a high level "H" at time t2, the oscillating frequency is reduced. When the level of the control signal LAT rises at time t3, the latch circuit 2 latches the signal DIN and outputs from a terminal RN. In a case where this operation is simply repeated, the signal output from the terminal RN is periodically changed. Thus, random numbers cannot be generated. However, when the phase of the oscillation is changed by adding noises to the signal DIN during the signal DIN oscillates, the latch circuit 2 outputs unpredictable values. In this case, at time t4, the latch circuit 2 outputs unpredictable values due to the influence of noises. In this example of an operation, the wave patterns of the signals FS and LAT have the same period and opposite phases. Accordingly, the control of the circuit can easily be achieved. Because data is obtained by causing the oscillating circuit to continuously oscillate, data acquisition efficiency is high. However, a high-frequency oscillating time is short. Thus, there is a possibility that the efficiency in outputting unpredictable values is low in a low-noise environment. An example of an operation of the random number generator illustrated in FIG. 5 is effective in cases where data is efficiently obtained in a high-noise environment, and where the control of a random number generator is simplified.

Figure 6:
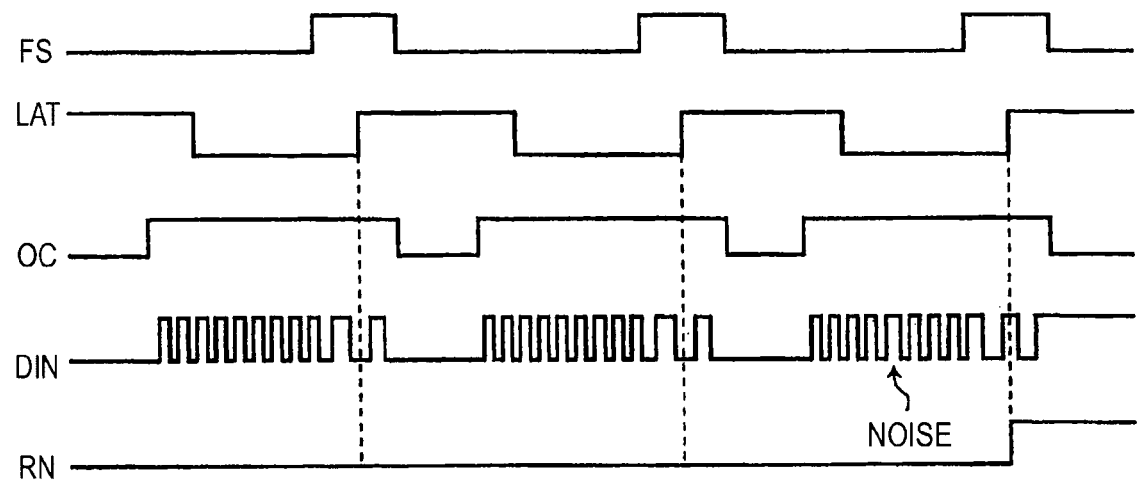
FIG. 6 is a timing chart illustrating another example of the operation when the circuit shown in FIG. 3 is employed.

FIG. 6 illustrates another example of an operation of the circuit illustrated in FIG. 3. In the case of the example illustrated in FIG. 5, the wave patterns of the signals FS and LAT have opposite phases. Thus, the length of a time, in which a high-frequency oscillation is performed, is equal to that of a time, in which a low-frequency oscillation is performed. On the other hand, in the case of the example of an operation illustrated in FIG. 6, the length of a time, in which a high-frequency oscillation is performed, is set to be longer than that of a time, in which a low-frequency oscillation is performed. The circuit can be easily affected by ambient noises by performing high-frequency oscillations. Such an operation is effective in a case where an amount of ambient noise is relatively low, and where a high-frequency oscillation is performed for a longer time. Although the oscillating circuit in the case of the example illustrated in FIG. 5 is caused to continuously oscillate, the oscillating circuit in the case of the example illustrated in FIG. 6 is caused to intermittently oscillate. Because it is unnecessary that the oscillating circuit oscillates upon completion of latching, the oscillating circuit is controlled to stop the oscillation upon completion of latching. Consequently, power consumption can be reduced, as compared with the case of causing the oscillating circuit to continuously oscillate. In the case of the example of the operation illustrated in FIG. 6, when there is no noise, a value output from the terminal RN of the latch circuit 2 is constant. However, in a case where the phase of the oscillation is changed due to noises, unpredictable values are output from the terminal RN.

Second Embodiment

Figure 7:
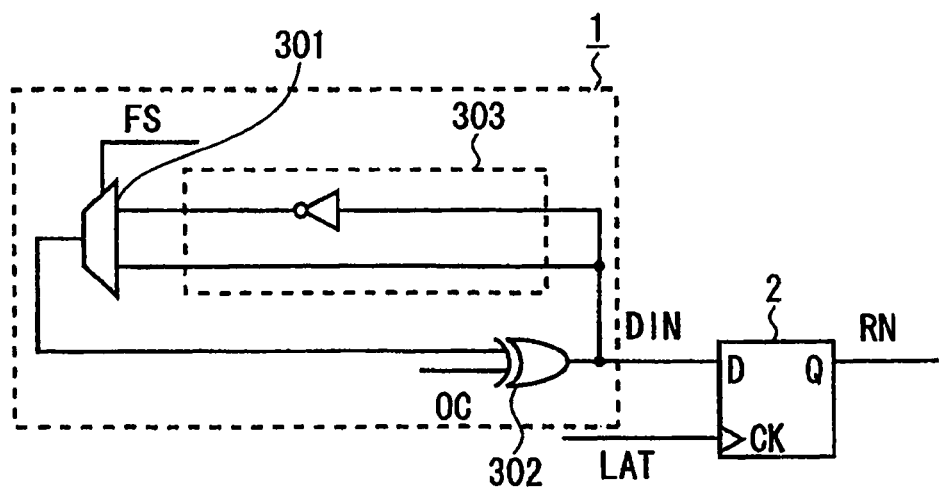
FIG. 7 is a block diagram illustrating a random number generator according to the second embodiment.
Figure 8:
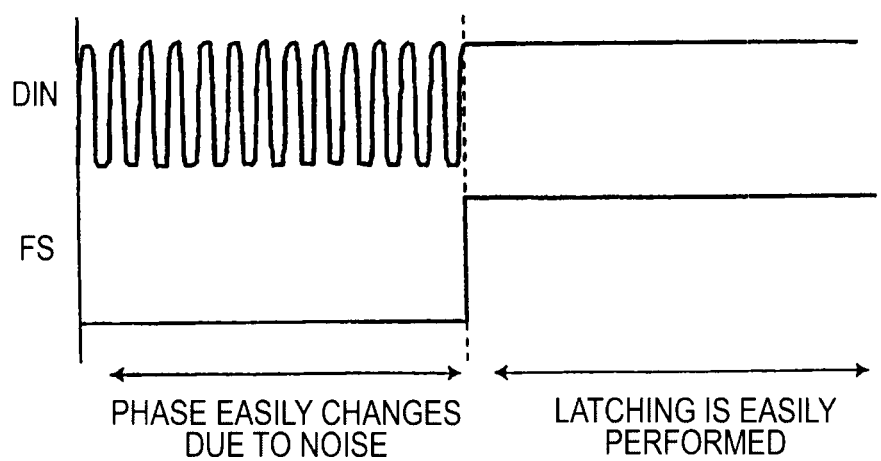
FIG. 8 is a wave pattern chart illustrating the relationship between wave patterns FS and DIN of a ring oscillator according to the second embodiment including an XOR, a buffer circuit, and a multiplexer.

A random number generator according to a second embodiment of the present invention will be described with reference to FIG. 7. The second embodiment differs from the first embodiment in that the buffer circuit including an inverter chain configured by twelve inverters according to the first embodiment is replaced with a buffer circuit 303 configured by a single inverter. Although the number of inverters included in an inverter chain of the buffer circuit 303 is one, the number of inverters configuring the inverter chain is optional, as long as the inverter chain is configured by an odd number of inverters. In a case where a loop is configured by an inverter circuit, a selection circuit, and an inverter circuit with a control terminal, a variable frequency oscillator is a bistable loop. FIG. 8 illustrates simulated wave pattern representing the relationship between a signal input to the terminal FS and a signal output from the terminal DIN of the circuit illustrated in FIG. 7. The signal output from the terminal DIN performs a high-frequency oscillation when the level of the signal input to the terminal FS has a low level "L". The signal output from the terminal DIN is brought into a bistable state and represents a constant value when the level of the signal input to the terminal FS has a high level "H". The random number generator illustrated in FIG. 7 has both of the advantage of high-frequency oscillations, which resides in that the phase of an oscillation can easily be changed, and that of constant value outputs, which resides in that latching can easily be achieved.

Figure 9:
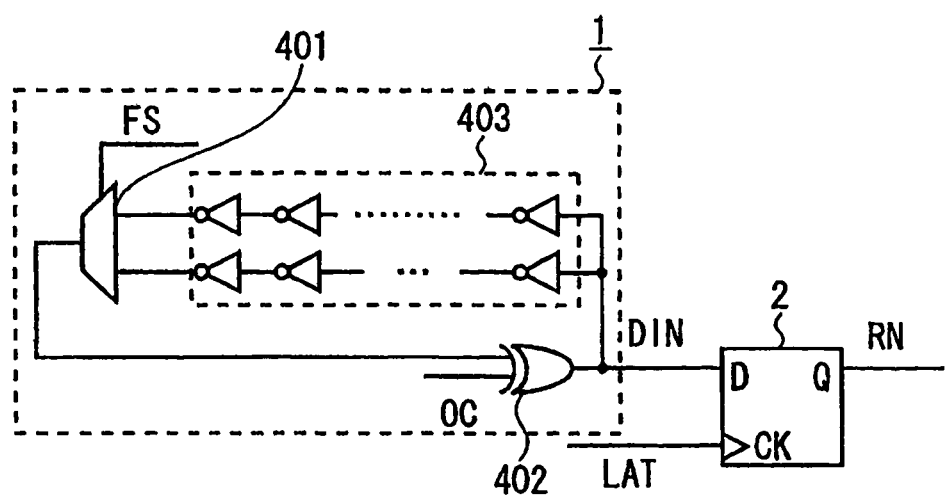
FIG. 9 is a block diagram illustrating another example of the random number generator according to the first embodiment.

FIG. 9 illustrates an example of the random number generator illustrated in FIG. 1. The random number generator illustrated in FIG. 9 differs from that illustrated in FIG. 3 in that each of two buffer circuits has an inverter chain configured by an even number of inverters. In the case of the example illustrated in FIG. 9, the number of stages of inverters of a lower inverter chain, as viewed in FIG. 9, is assumed to be less than that of stages of inverters of an upper inverter chain. With such a circuit configuration, wave patterns similar to those illustrated in FIG. 4 can be obtained. In some case, in consideration of the influence on the surrounding circuits, it should be avoided to dispose a very high frequency oscillator in the circuit. In such a case, the high oscillating frequency can be lowered by providing the circuit as illustrated in FIG. 9.

Figure 10:
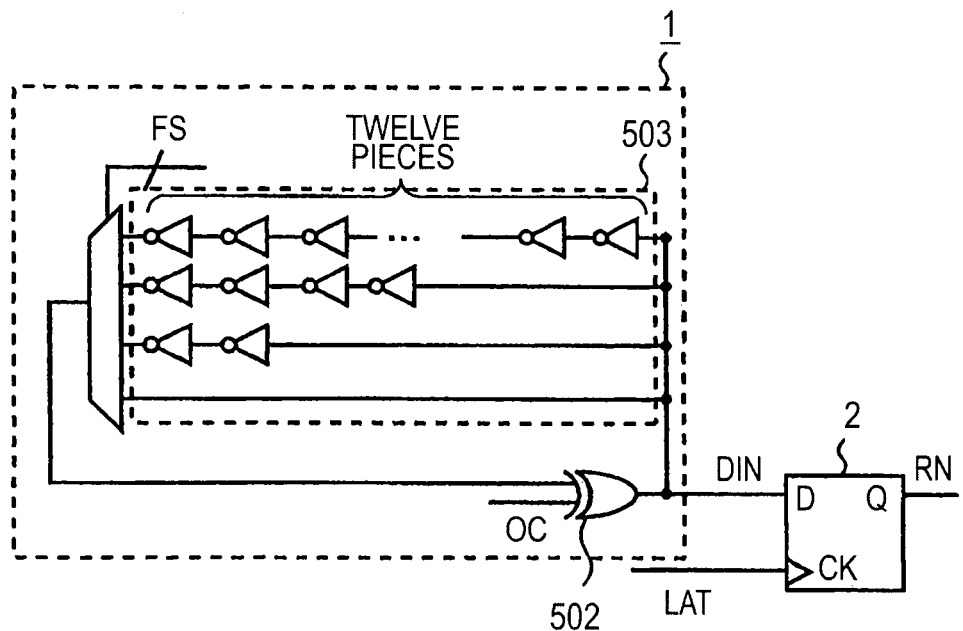
FIG. 10 is a block diagram illustrating another example of the random number generator according to the first embodiment.

FIG. 10 illustrates an example of the random number generator illustrated in FIG. 1. The random number generator illustrated in FIG. 10 uses four buffer circuits, each of which is configured by a short circuit, an inverter circuit including an inverter chain configured by two series-connected inverters, an inverter circuit including an inverter chain configured by four series-connected inverters, and an inverter circuit including an inverter chain configured by twelve series-connected inverters. This variable frequency oscillator is configured to have four oscillating frequencies. With such a circuit configuration, wave patterns similar to those illustrated in FIG. 4 can be obtained. According to the above described circuit configuration, the variable frequency oscillator is configured to have oscillating frequencies that are selectable even after manufacturing the variable frequency oscillator.

For example, in a case where the oscillation caused by the loop using the short circuit serves as a noise source for surrounding circuits, the influence of noises upon the surrounding circuits can be reduced by using the loop configured by two inverters. Further, in a case where the buffer circuit including an inverter chain configured by four inverters cannot satisfy the Expression (1), the Expression (1) can be satisfied by using the buffer circuit including an inverter chain configured by twelve inverters. This random number generator is configured so that such an adjustment can be performed after the manufacture thereof. Consequently, this random number generator can be adjusted to deal with problems of variation in the manufactured circuits and the magnitude of ambient noise.

Figure 11:
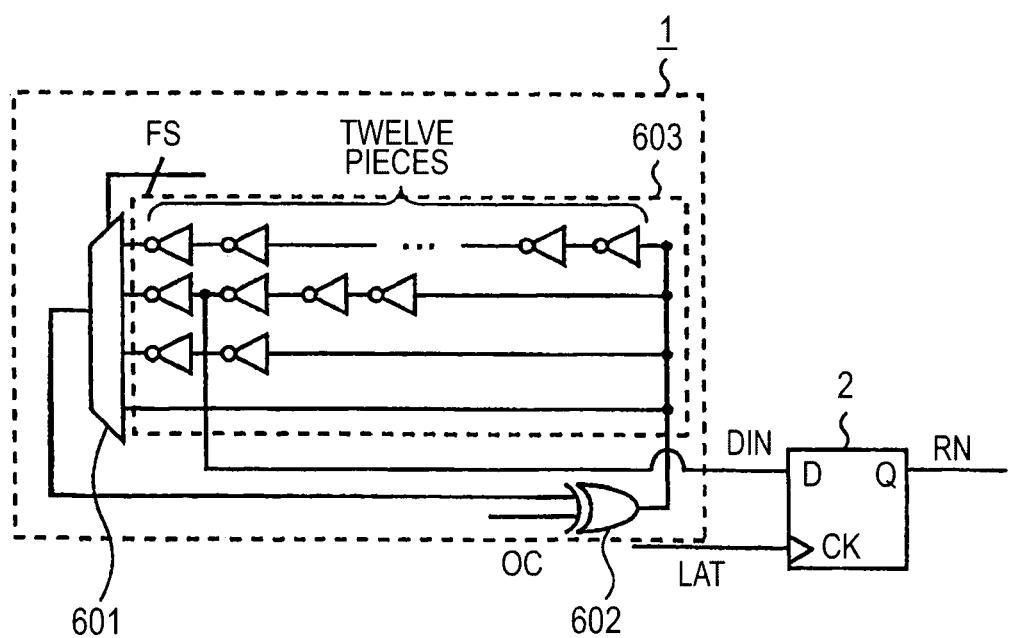
FIG. 11 is a block diagram illustrating another example of the random number generator according to the first embodiment.

FIG. 11 illustrates an example of the random number generator illustrated in FIG. 1. The random number generator illustrated in FIG. 11 differs from that illustrated in FIG. 10 in the position of a point from which a signal input to the terminal DIN is extracted. As illustrated in FIG. 11, a signal input to the terminal DIN is extracted from any point of the variable frequency oscillator. This is because the buffer circus and the inverter circuit, which are not selected by the selection circuit, oscillate at the same oscillating frequency as that at which the variable frequency oscillator oscillates.

Figure 12:
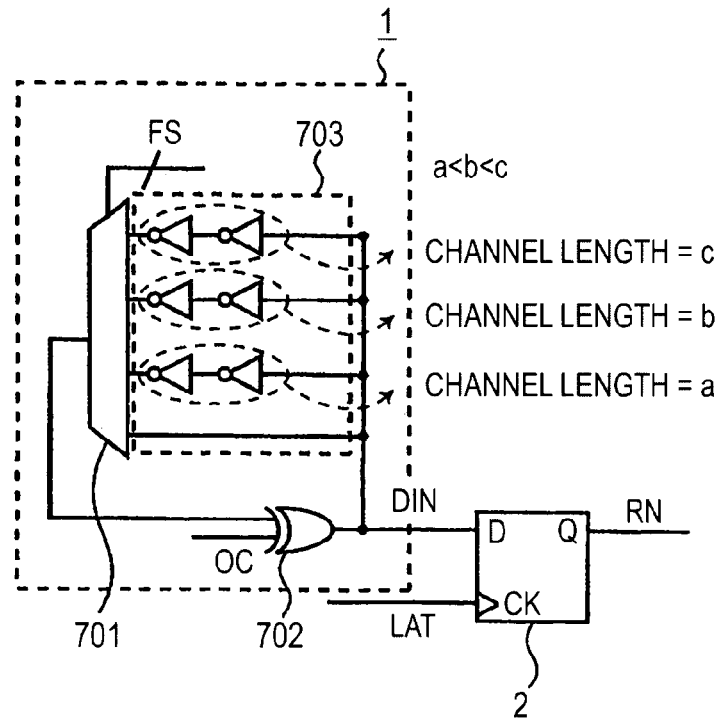
FIG. 12 is a block diagram illustrating another example of the random number generator according to the first embodiment.

FIG. 12 illustrates another example of the random number generator illustrated in FIG. 1. The example illustrated in FIG. 12 uses buffer circuits respectively including inverter chains each of which is configured by inverters that differ from inverters of the inverter chains of the other buffer circuits in channel length. The gate delay of each inverter is increased by lengthening the channel length. Thus, the oscillating frequency can be lowered. With such a circuit configuration, wave patterns similar to those illustrated in FIG. 4 can be obtained.

Figure 13:
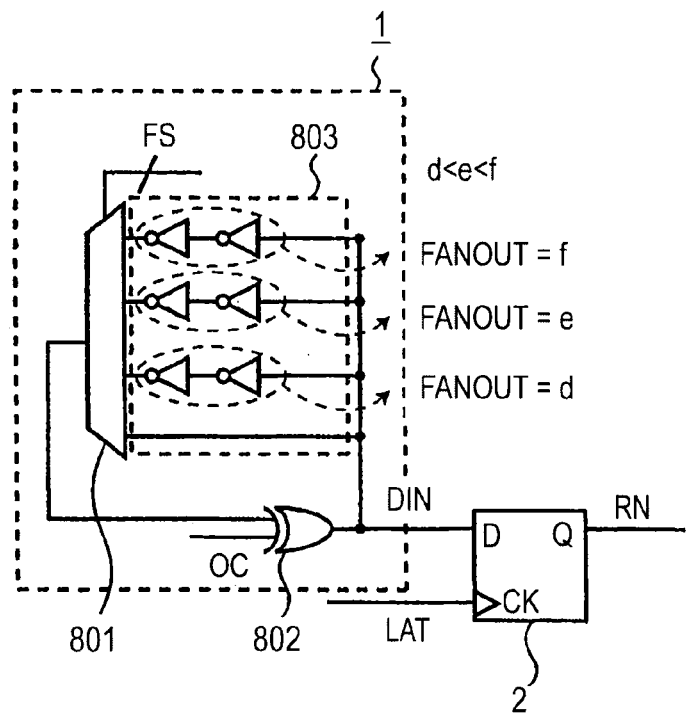
FIG. 13 is a block diagram illustrating another example of the random number generator according to the first embodiment.

FIG. 13 illustrates another example of the random number generator illustrated in FIG. 1. The example illustrated in FIG. 13 uses buffer circuits respectively including inverter chains each of which is configured by inverters that differ from inverters of the inverter chains of the other buffer circuits in the number of fanouts. The gate delay of each inverter is increased by reducing the fanout. Thus, the oscillating frequency can be lowered. With such a circuit configuration, wave patterns similar to those illustrated in FIG. 4 can be obtained.

Figure 14:
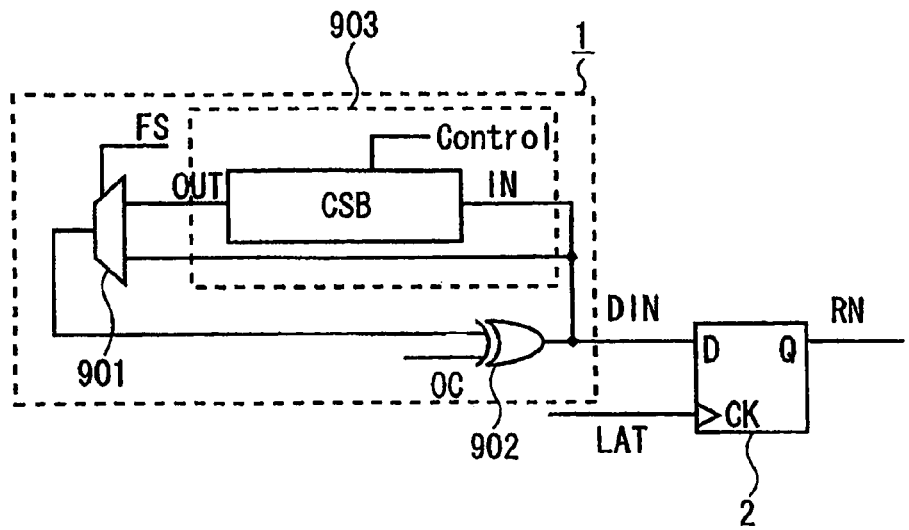
FIG. 14 is a block diagram illustrating another example of the random number generator according to the first embodiment.
Figure 15:
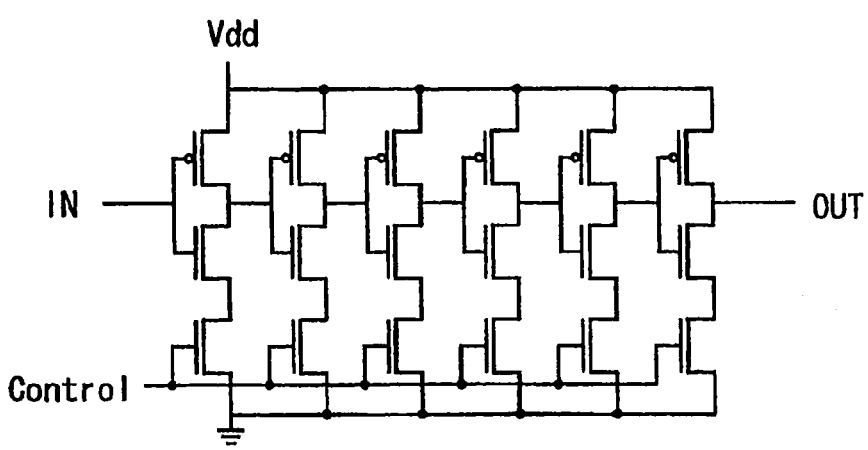
FIG. 15 is a block diagram illustrating another example of the random number generator according to the first embodiment.

FIG. 14 illustrates another example of the random number generator illustrated in FIG. 1. The example illustrated in FIG. 14 uses a current starved buffer (CSB) as the buffer circuit. With such a circuit configuration, wave patterns similar to those illustrated in FIG. 4 can be obtained. FIG. 15 is a circuit diagram illustrating the CSB. The CSB is configured so that the transmission delay of transmission of a signal from the terminal IN to the terminal OUT can be changed according to a voltage applied to the terminal Control. In the case of using this circuit, the oscillating frequency can be changed after the manufacture of this circuit. In addition, the oscillating frequency can be changed during oscillation at a low frequency. Consequently, a control operation implemented in consideration of variation in the manufactured circuits and the influence upon surrounding circuits can be performed.

Figure 16:
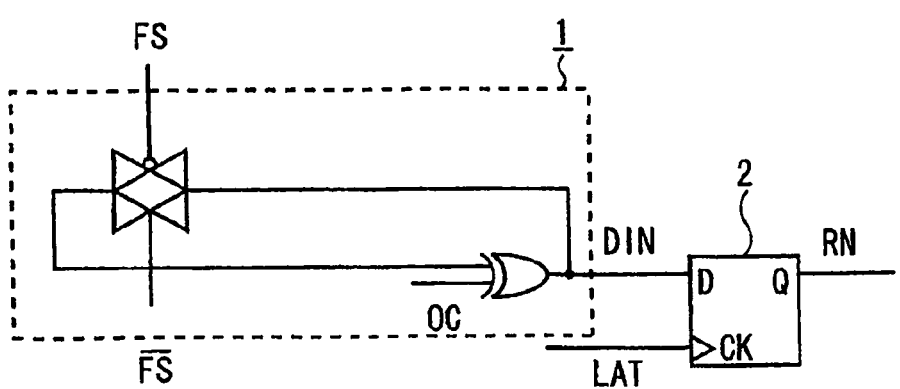
FIG. 16 is a block diagram illustrating another example of the random number generator according to the first embodiment.

FIG. 16 illustrates another example of the random number generator illustrated in FIG. 1. The example illustrated in FIG. 16 uses only one buffer circuit. This example uses a transmission gate as the selection circuit. The oscillation wave pattern of this random number generator is similar to that illustrated in FIG. 8.

Figure 17:
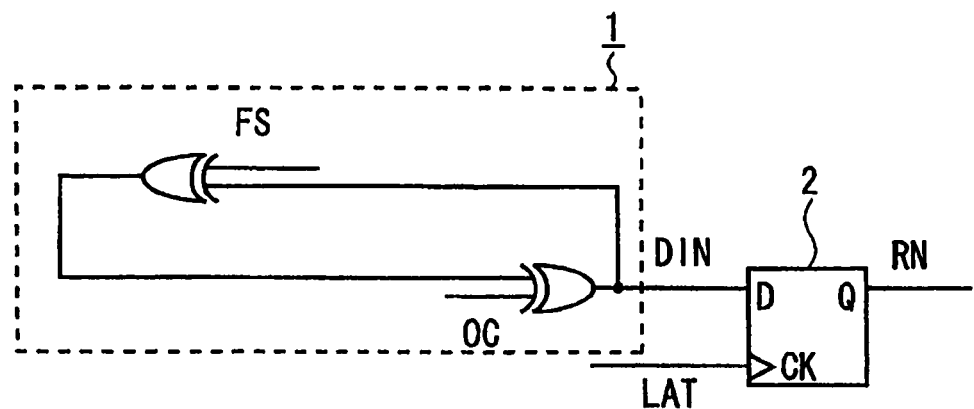
FIG. 17 is a block diagram illustrating another example of the random number generator according to the second embodiment.

FIG. 17 illustrates another example of the random number generator illustrated in FIG. 1. The example illustrated in FIG. 17 uses only one buffer circuit. This example uses an XOR gate as the selection circuit. The oscillation wave pattern of this random number generator is similar to that illustrated in FIG. 8.

Third Embodiment

Figure 18:
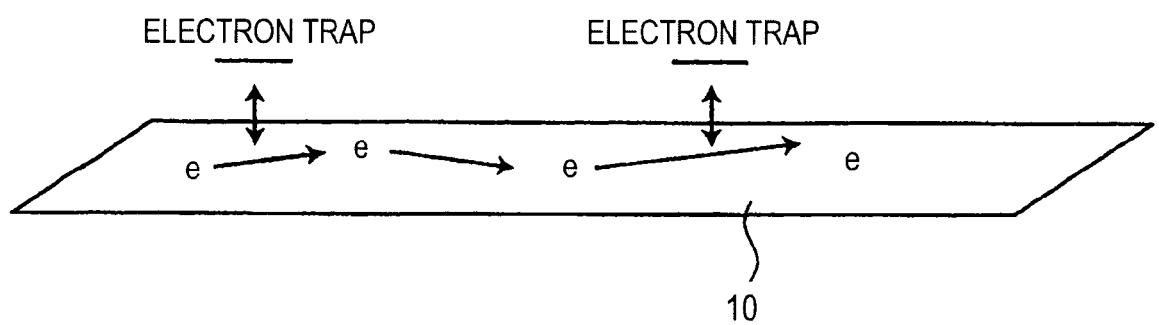
FIG. 18 is a diagram illustrating a noise device according to a third embodiment.

A random number generator according to a third embodiment of the present invention will be described with reference to FIG. 18. In the random number generator according to the third embodiment, a device (noise device) that is intentionally configured to increase the current noise and the voltage noise is be used as a component of a random number generator. Accordingly, as compared with a case where a noise source is only a thermal noise source, efficiency in generating a random number can be increased. In addition, the quality of the randomness of the random number can be improved. That is, a random number generator according to the present invention can be used as a so-called physical random number generator. The term "noise device" designates, e.g., a device having a nanoscale electron channel 10 and an electron trap, which is provided in the vicinity of the electron channel 10 and generates a noise signal, as illustrated in FIG. 18.

The noise device is, e.g., a field-effect transistor (FET) having a nanoscale channel length and a nanoscale channel width. The electron channel 10 is a channel between a source region and a drain region thereof. The electron trap is provided in a gate insulting film. When an electron (e) is trapped by the electron trap, an electron passing through the electron channel is affected by a Coulomb field generated due to the electron. Thus, the conductance of the electron channel 10 is changed. The trapping or emission of electrons is performed between the electron channel 10 and the electron trap via an energy barrier provided therebetween. The trapping or emission of electrons is thermally and randomly caused. Thus, the conductance of the electron channel 10 is randomly fluctuated. Consequently, even when a constant current or a constant voltage is supplied to the electron channel 10, a noise signal, the current value and the voltage value of which are randomly fluctuated, can be generated in the electron channel 10.

Fourth Embodiment

Figure 19:
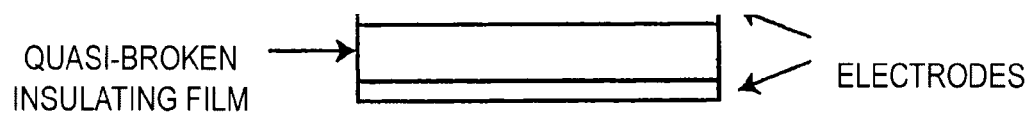
FIG. 19 is a diagram illustrating a noise device according to a fourth embodiment.

A random number generator according to a fourth embodiment of the present invention will be described with reference to FIG. 19. As illustrated in FIG. 19, the noise device can be configured by a quasi-broken insulating film that is sandwiched between electrodes. This noise device is, e.g., a capacitor. When electric stress is applied to the insulating film, the capacitor is brought into a state in which the conductance of the insulating film is slightly increased. At that time, when a constant current or a constant voltage is supplied to the insulating film, electrons (e) randomly move between the electron traps in the insulating film by tunneling. Consequently, a largely fluctuated current value or voltage value is obtained. Accordingly, a noise signal can be generated due to the fluctuation of the current value or the voltage value.

The electrodes are formed of a conductive material, such as single-crystal silicon, polysilicon, amorphous silicon, and a metal. Insulating materials, e.g., single-layer films, such as a silicon dioxide film and a silicon nitride film, a highly dielectric oxide film (a so-called high-k insulating film) including hafnium or aluminum, and a composite film obtained by stacking such films are used as the material of the insulating film.

Fifth Embodiment

Figure 20:
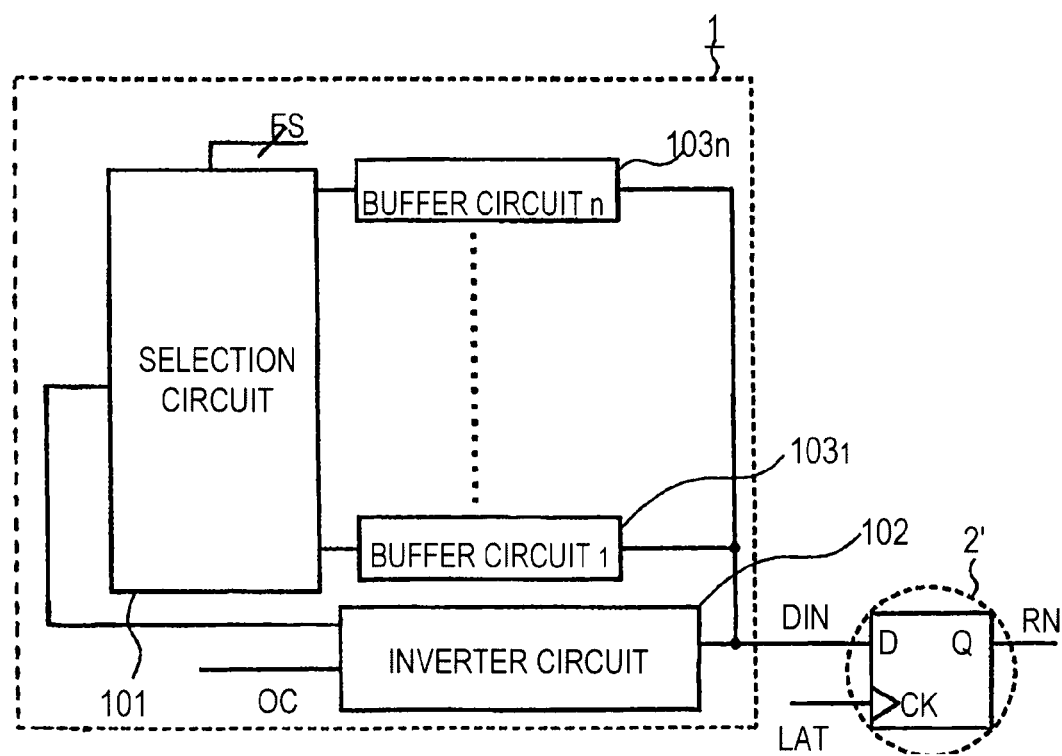
FIG. 20 is a block diagram illustrating a random number generator according to a fifth embodiment.

A random number generator according to a fifth embodiment of the present invention will be described with reference to FIG. 20. FIG. 20 illustrates the random number generator in which the entirety or a part of the latch circuit 2 illustrated in FIG. 1 is configured utilizing the noise device. This random number generator can output unpredictable values, because latch-timing is fluctuated due to the influence of the noise device. Consequently, the present embodiment can have advantages in that efficiency in generating a random number is increased, and that the quality of the generated random number is improved.

Sixth Embodiment

Figure 21:
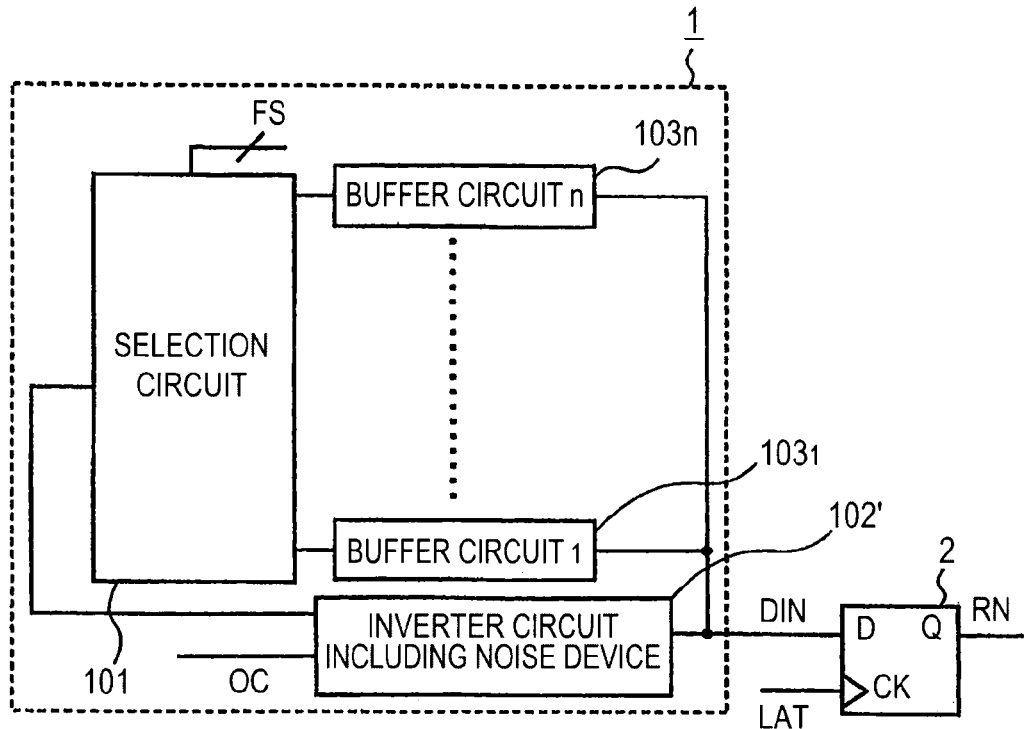
FIG. 21 is a block diagram illustrating a random number generator according to a sixth embodiment.

A random number generator according to a sixth embodiment of the present invention will be described with reference to FIG. 21. FIG. 21 illustrates the random number generator in which the entirety or a part of the inverter circuit 102 illustrated in FIG. 1 is configured by utilizing the noise device. This random number generator can output unpredictable values, because an oscillating frequency is fluctuated due to the influence of the noise device. Consequently, the present embodiment can have advantages in that efficiency in generating a random number is increased, and that the quality of the generated random number is improved.

Seventh Embodiment

Figure 22:
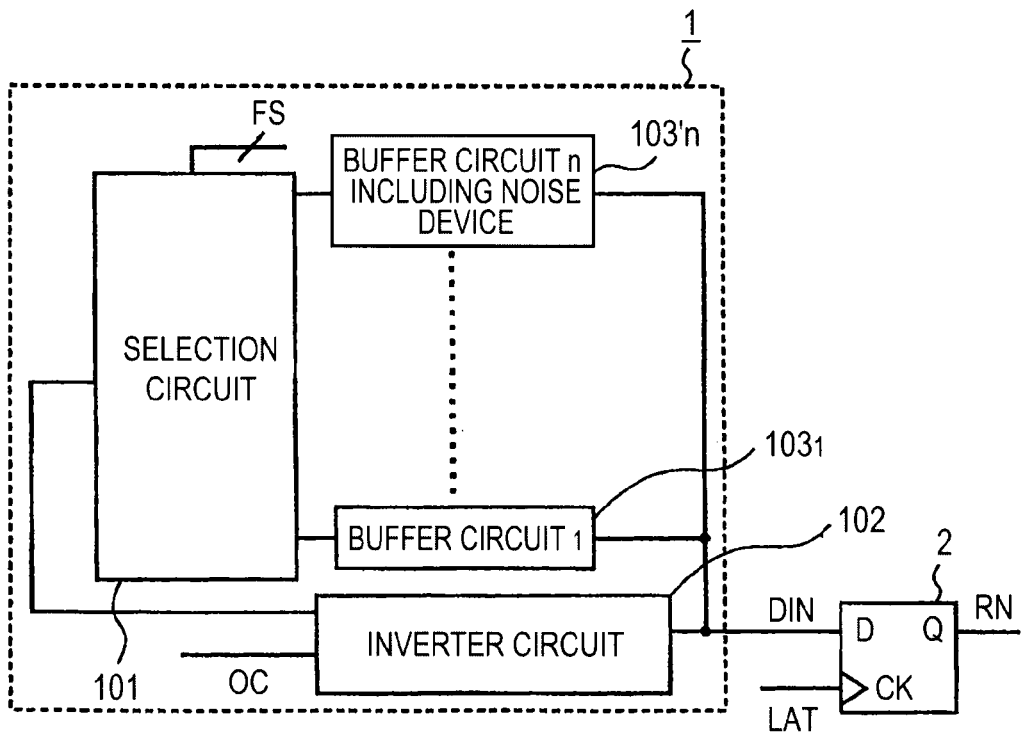
FIG. 22 is a block diagram illustrating a random number generator according to a seventh embodiment.

A random number generator according to a seventh embodiment of the present invention will be described with reference to FIG. 22. FIG. 22 illustrates the random number generator in which the entirety or a part of the buffer circuits $103_1$ to $103_n$ illustrated in FIG. 1 is configured by utilizing the noise device. This random number generator can output unpredictable values, because an oscillating frequency is fluctuated due to the influence of the noise devices. Consequently, the present embodiment can have advantages in that efficiency in generating a random number is increased, and that the quality of the generated random number is improved. Although FIG. 22 illustrates only one noise device buffer circuit, a plurality of noise device buffer circuits can be provided in the random number generator.

Eighth Embodiment

Figure 23:
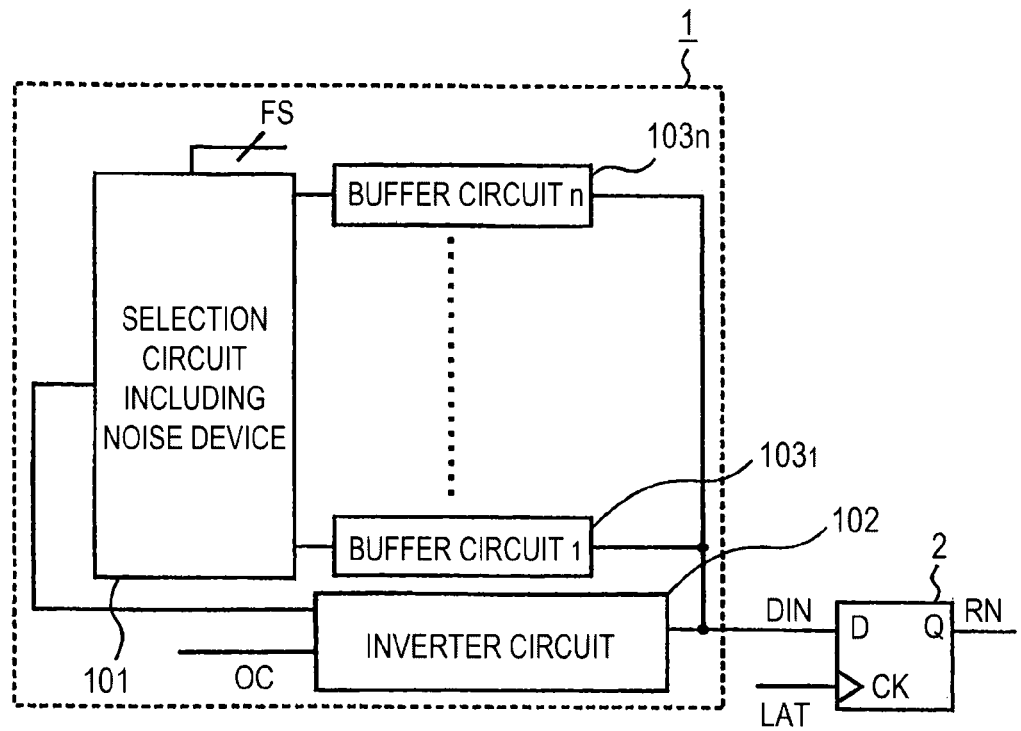
FIG. 23 is a block diagram illustrating a random number generator according to an eighth embodiment.

A random number generator according to an eighth embodiment of the present invention will be described with reference to FIG. 23. FIG. 23 illustrates the random number generator in which the entirety or a part of the selection circuit 101 is configured by utilizing the noise device. This random number generator can output unpredictable values, because an oscillating frequency and frequency-change timing are fluctuated due to the influence of the noise device. Consequently, the present embodiment can have advantages in that efficiency in generating a random number is increased, and that the quality of the generated random number is improved.

Ninth Embodiment

A random number generator according to a ninth embodiment of the present invention will be described with reference to FIGS. 24 to 29. It is advantageous for obtaining unpredictable values to connect the noise device between the components of the random number generator or to the control terminal.

Figure 24:
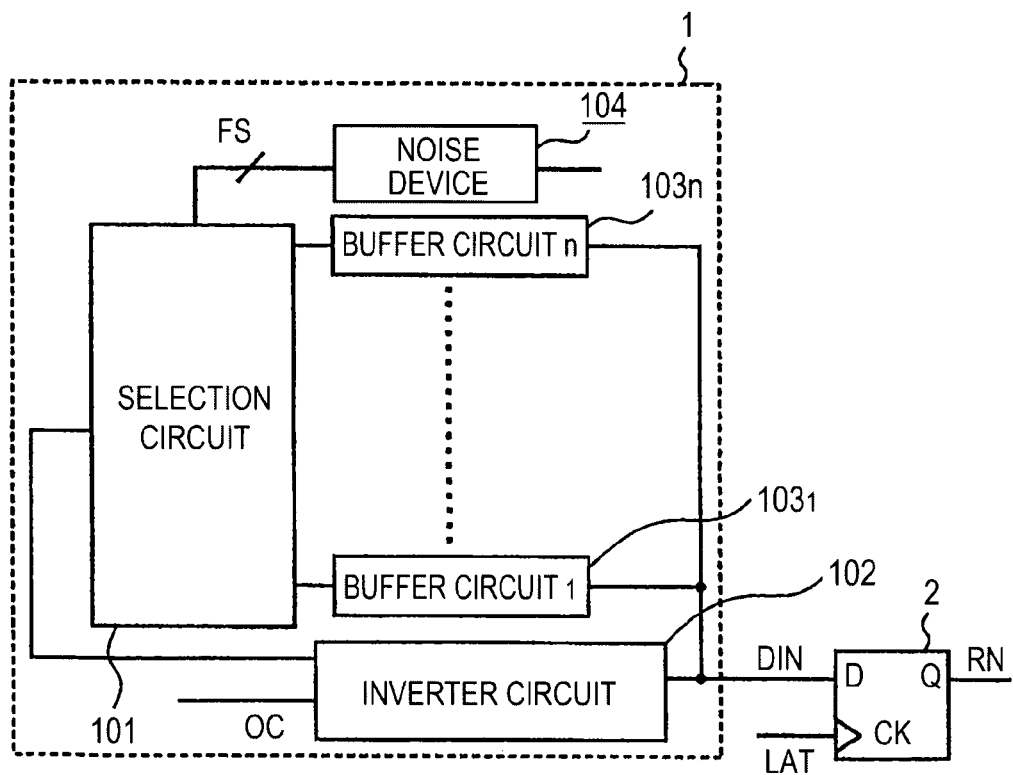
FIG. 24 is a block diagram illustrating a random number generator according to a ninth embodiment.

FIG. 24 illustrates an example in which a noise device 104 is connected to the control terminal FS. In this random number generator, oscillating-frequency change timing is fluctuated due to the influence of the noise device 104. Thus, the random number generator can output unpredictable values. Consequently, the random number generator according to the present example can have advantages in that efficiency in generating a random number is increased, and that the quality of the generated random number is improved.

Figure 25:
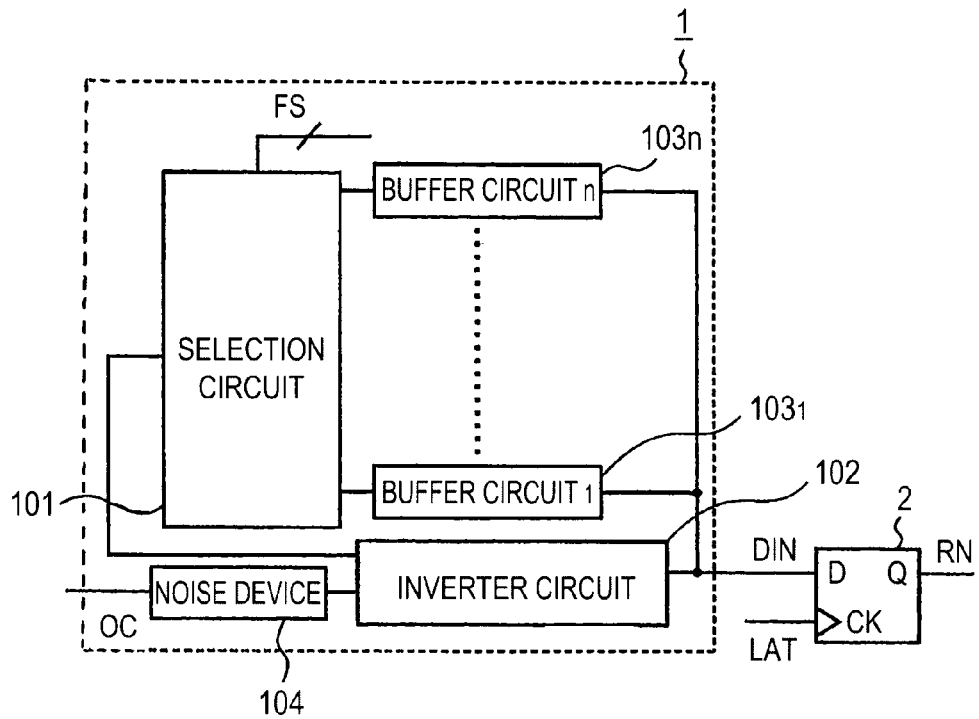
FIG. 25 is a block diagram illustrating another example of the random number generator according to the ninth embodiment.

FIG. 25 illustrates an example in which a noise device 104 is connected to the control terminal OC. In this random number generator, oscillating-start timing is fluctuated due to the influence of the noise device 104. Thus, the random number generator can output unpredictable values. Consequently, the random number generator according to the present example can have advantages in that efficiency in generating a random number is increased, and that the quality of the generated random number is improved.

Figure 26:
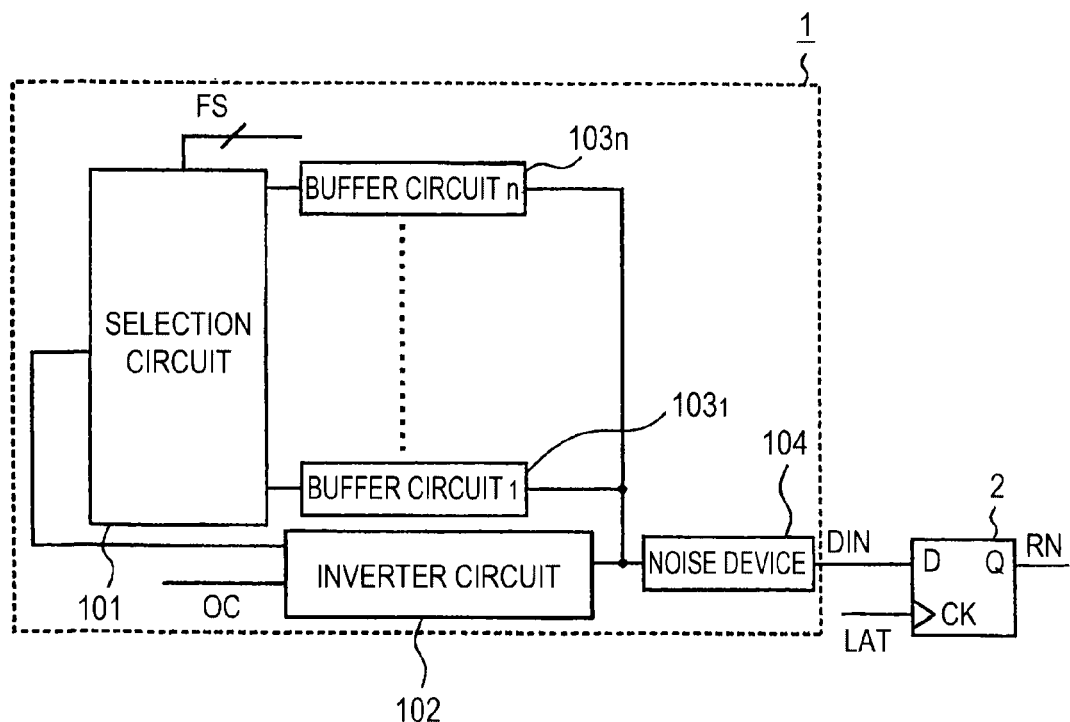
FIG. 26 is a block diagram illustrating another example of the random number generator according to the ninth embodiment.

FIG. 26 illustrates an example in which a noise device 104 is connected to an input terminal of the latch circuit 2 shown in FIG. 1. In this random number generator, a signal input to the latch circuit 2 is fluctuated due to the influence of the noise device 104. Thus, the random number generator can output unpredictable values. Consequently, the random number generator according to the present example can have advantages in that efficiency in generating a random number is increased, and that the quality of the generated random number is improved.

Figure 27:
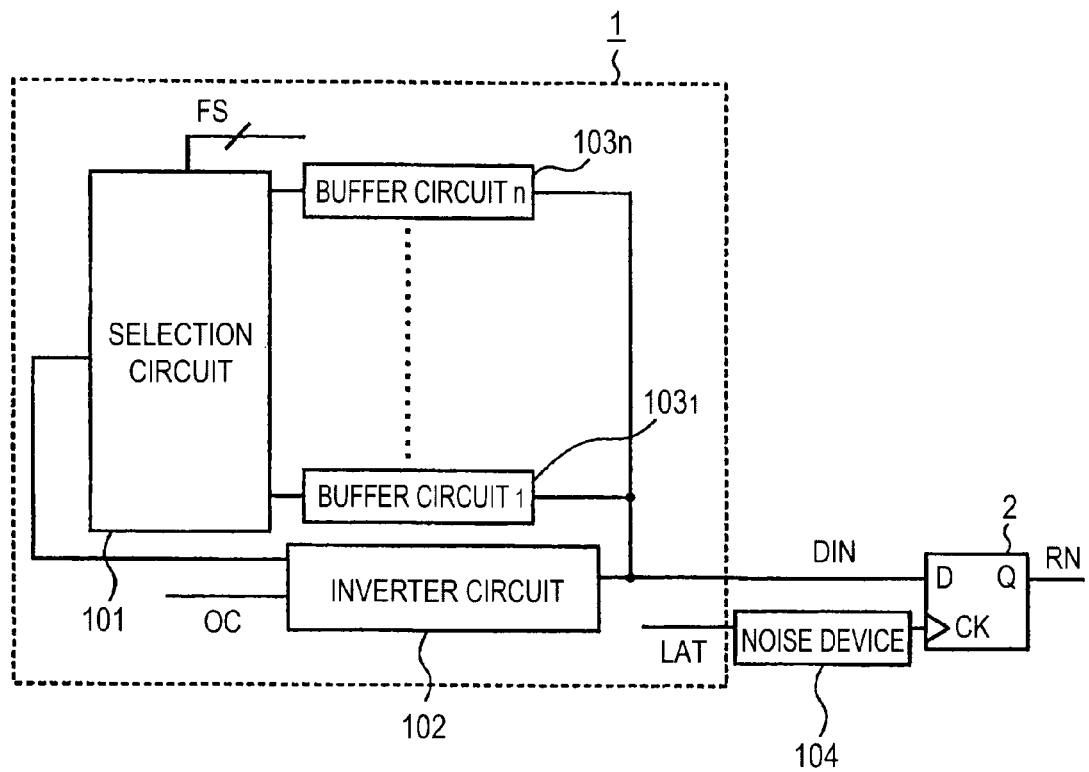
FIG. 27 is a block diagram illustrating another example of the random number generator according to the ninth embodiment.

FIG. 27 illustrates an example in which a noise device 104 is connected to a clock input terminal of the latch circuit 2 shown in FIG. 1. In this random number generator, latch timing is fluctuated due to the influence of the noise device 104. Thus, the random number generator can output unpredictable values. Consequently, the random number generator according to the present example can have advantages in that efficiency in generating a random number is increased, and that the quality of the generated random number is improved.

Figure 28:
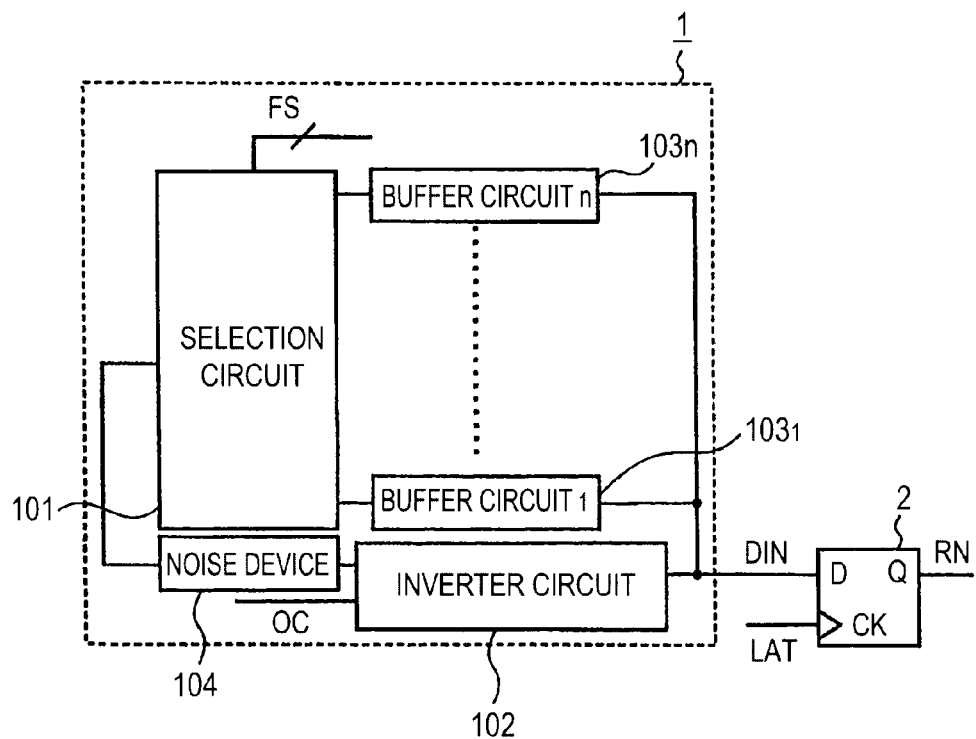
FIG. 28 is a block diagram illustrating another example of the random number generator according to the ninth embodiment.

FIG. 28 illustrates an example in which a noise device 104 is connected to between the selection circuit 101 and the inverter circuit 102 shown in FIG. 1. In this random number generator, an oscillating frequency is fluctuated due to the influence of the noise device 104. Thus, the random number generator can output unpredictable values. Consequently, the random number generator according to the present example can have advantages in that efficiency in generating a random number is increased, and that the quality of the generated random number is improved.

Figure 29:
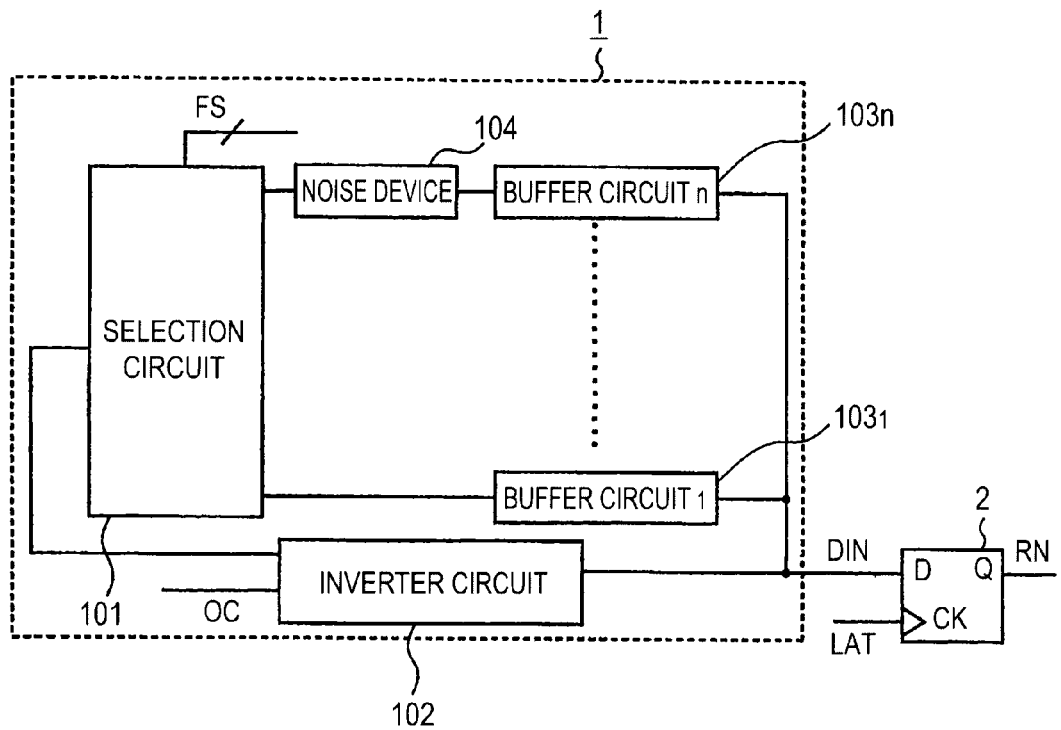
FIG. 29 is a block diagram illustrating another example of the random number generator according to the ninth embodiment.

FIG. 29 illustrates an example in which a noise device 104 is connected to between the buffer circuit 103n and the selection circuit 101 shown in FIG. 1. In this random number generator, an oscillating frequency is fluctuated due to the influence of the noise device 104. Thus, the random number generator can output unpredictable values. Consequently, the random number generator according to the present example can have advantages in that efficiency in generating a random number is increased, and that the quality of the generated random number is improved.

Figure 30:
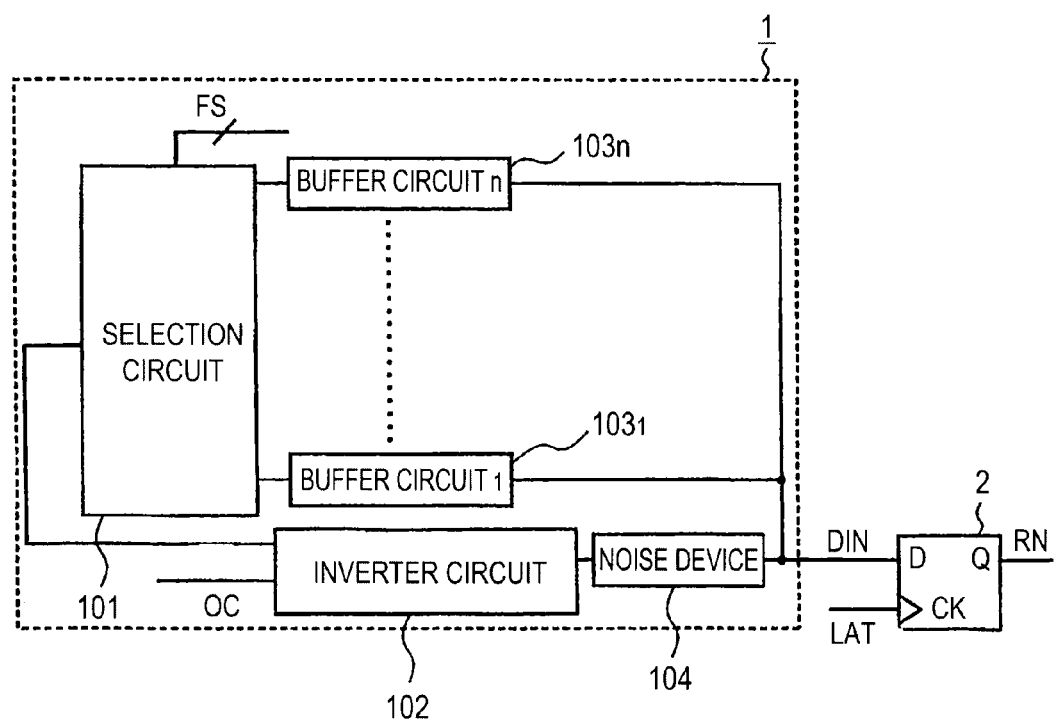
FIG. 30 is a block diagram illustrating another example of the random number generator according to the ninth embodiment.

FIG. 30 illustrates an example in which a noise device 104 is connected to between the inverter circuit 102 and the buffer circuits $103_1$ to $103_n$ shown in FIG. 1. In this random number generator, an oscillating frequency is fluctuated due to the influence of the noise device 104. Thus, the random number generator can output unpredictable values. Consequently, the random number generator according to the present example can have advantages in that efficiency in generating a random number is increased, and that the quality of the generated random number is improved.

Figure 31:
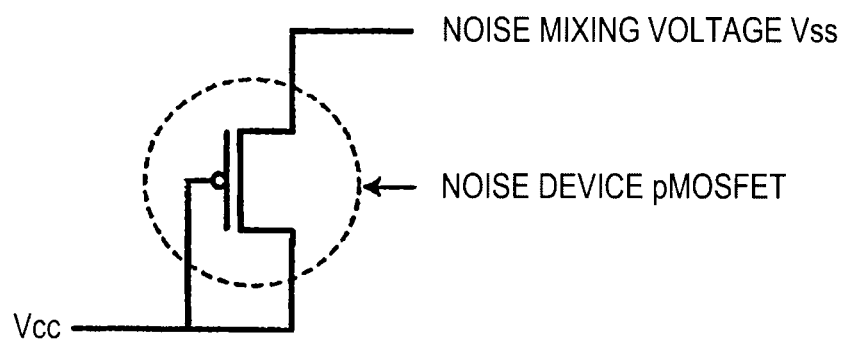
FIG. 31 is a circuit diagram illustrating a circuit for mixing noise into a voltage signal Vss.
Figure 32:
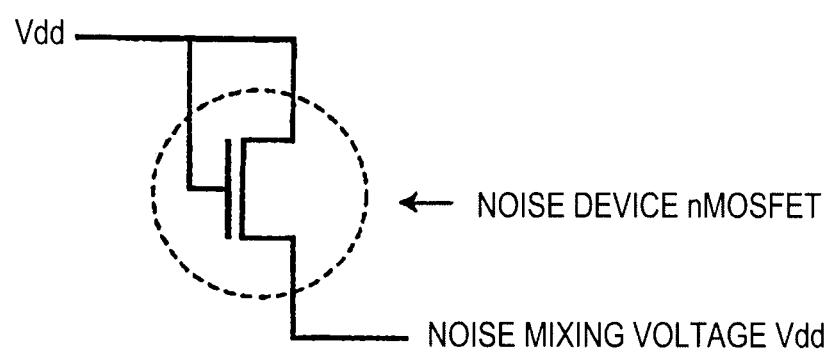
FIG. 32 is a circuit diagram illustrating a circuit for mixing noise into a voltage signal Vdd.

Alternatively, an unpredictable value can be obtained by incorporating the device into a power supply and applying a fluctuation to the power supply voltage of each circuit. FIGS. 31 and 32 illustrate circuits configured so that noises are mixed into power supply voltages Vdd and Vss to be applied thereto, respectively. Noise devices are connected to the circuits, as illustrated in FIGS. 31 and 32. Thus, a fluctuation can be given to the power supply voltage applied to the noise device. The fluctuation of the voltage applied to the noise device causes a fluctuation in each of the oscillating frequency, the latch timing, the frequency-change timing, the oscillating start timing, and so on. Consequently, the random number generator according to the present invention can output unpredictable values.

It is to be understood that the present invention is not limited to the specific embodiments described above and that the present invention can be embodied with the components modified without departing from the spirit and scope of the present invention. The present invention can be embodied in various forms according to appropriate combinations of the components disclosed in the embodiments described above. For example, some components may be deleted from the configurations described as the embodiments. Further, the components described in different embodiments may be used appropriately in combination.

What is claimed is:

1. A random number generator comprising:
   a variable frequency oscillator that comprises:
      a selection circuit having multiple input terminals and an output terminal;
      a parallel circuit having an input terminal and multiple output terminals that are respectively connected to the input terminals of the selection circuit, the parallel circuit comprising one or more buffer circuits to be selected by the selection circuit; and
      an inverter circuit having a control terminal, the inverter circuit being connected to the input terminal of the parallel circuit and to the output terminal of the selection circuit; and
   a latch circuit connected to the variable frequency oscillator, wherein
   the variable frequency oscillator outputs a signal having a variable frequency, where $T_H$ is a time in which a level of the output signal is high and $T_L$ is a time in which the level of the output signal is low,
   the latch circuit has a setup time $T_{SET}$ and a hold time $T_{HOLD}$, and $$\min(T_H, T_L) > (T_{SET} + T_{HOLD}).$$

2. The random number generator according to claim 1, wherein the selection circuit is a multiplexer.

3. The random number generator according to claim 1, wherein the selection circuit is a transmission gate.

4. The random number generator according to claim 1, wherein the inverter circuit is an XOR gate.

5. The random number generator according to claim 1, wherein the parallel circuit is configured by the buffer circuits and a short circuit that are arranged in parallel with one another, and
   wherein each of the buffer circuits is configured by an inverter chain.

6. The random number generator according to claim 1, wherein each of the buffer circuits is configured by an inverter chain having the number of stages different from those of other buffer circuits.

7. The random number generator according to claim 5, wherein inverters configuring the inverter chain are configured by transistors,
wherein a channel length of the transistors in the inverter chain differs from those of the transistors in other inverter chains.

8. The random number generator according to claim 5, wherein inverters configuring the inverter chain are configured by transistors,
wherein a fanout of the transistors in the inverter chain differs from those of the transistors in other inverter chains.

9. The random number generator according to claim 1, wherein the parallel circuit is configured by the buffer circuits and a short circuit that are arranged in parallel with one another, and
wherein the buffer circuits are configured by current starved buffers.

10. The random number generator according to claim 1, wherein the latch circuit comprises a noise device.

11. The random number generator according to claim 1, wherein the inverter circuit comprises a noise device.

12. The random number generator according to claim 1, wherein at least one of the buffer circuits comprises a noise device.

13. The random number generator according to claim 1, wherein the selection circuit comprises a noise device.

14. The random number generator according to claim 1 further comprising a noise device that is connected to a control terminal of the selection circuit.

15. The random number generator according to claim 1 further comprising a noise device that is connected to the control terminal of the inverter circuit.

16. The random number generator according to claim 1 further comprising a noise device that is connected between the variable frequency oscillator and the latch circuit.

17. The random number generator according to claim 1 further comprising a noise device that is connected to a clock input terminal of the latch circuit.

18. The random number generator according to claim 1 further comprising a noise device that is connected between the selection circuit and the inverter circuit.

19. The random number generator according to claim 1 further comprising a noise device that is connected between the selection circuit and at least one of the buffer circuits.

20. The random number generator according to claim 1 further comprising a noise device that is connected between the inverter circuit and at least one of the buffer circuits.

* * * * *